United States Patent

Haraszti

[15] 3,683,201

[45] Aug. 8, 1972

[54] LOGIC INTERCONNECTIONS

[72] Inventor: Tegze Haraszti, Rollwagstr. 4, 71 Heilbronn, Germany

[22] Filed: May 12, 1970

[21] Appl. No.: 36,639

[30] Foreign Application Priority Data

May 31, 1969 Germany..........P 19 27 873.0

[52] U.S. Cl. ..................307/205, 307/215, 307/218, 307/208

[51] Int. Cl....H03k 19/08, H03k 19/12, H03k 19/34

[58] Field of Search...............307/205, 251, 279, 304

[56] References Cited

UNITED STATES PATENTS

| | | | |
|---|---|---|---|
| 3,153,154 | 10/1964 | Murray et al. | 307/304 X |
| 3,497,715 | 2/1970 | Yen | 307/205 |
| 3,515,901 | 6/1970 | White | 307/304 X |
| 3,517,210 | 6/1970 | Rubinstein | 307/205 |
| 3,524,077 | 8/1970 | Kaufman | 307/251 X |

OTHER PUBLICATIONS

IBM Tech. Disclosure Bul. Vol. 10, No. 2 July 1967 " Logic Circuit" by Berding.

IBM Tech. Disclosure Bul. Vol. 11, No. 12 May 1969 " Diode Load in Nor Block Cir." by Terman.

*Primary Examiner*—John S. Heyman

*Attorney*—Spencer & Kaye

[57] ABSTRACT

A dynamic logic interconnection operated by clock pulses and comprising a component which is operated as a diode having two electrodes and at least one active circuit element, such as a transistor, having a gate and two other electrodes and a controlled current path, one electrode of the component operated as a diode being connected to the controlled current path from one electrode of the active circuit element.

14 Claims, 12 Drawing Figures

PATENTED AUG 8 1972 3,683,201

Inventor:
Tegze Haraszti
BY Spencer & Kaye
ATTORNEYS.

LOGIC INTERCONNECTIONS

BACKGROUND OF THE INVENTION

The invention relates to a dynamic logic interconnection, operated by clock pulses.

Known logic interconnections consist for example, of a plurality of field effect transistors connected in series. At least two phase clock pulses $\phi_1$ and $\phi_2$ are always necessary for the operation of these circuits. In contrast, the object of the present invention is to provide a logic interconnection which can be operated with a single phase clock pulse.

SUMMARY OF THE INVENTION

According to the present invention, there is provided a dynamic logic interconnection operated by clock pulses and comprising a component operated as a diode having two electrodes and at least one active circuit element having a gate and two electrodes and a controlled current path from one electrode, one electrode of the component operated as a diode being connected to the controlled current path of the active circuit element.

The logic interconnection according to the invention serves as a basic unit for circuits which fulfill the most varied logical functions. The basic unit according to the invention and the further logic circuit interconnections derived therefrom are distinguished by high speed and by the small number of components. A further advantage of the logic interconnections according to the invention is their extremely low power consumption during operation. This is attributable in particular to the fact that the circuits only consume power during the recharging or charging of the storage capacitors associated with the active components and ohmic losses are kept very low as a result of the completely novel construction of the logic circuits. In addition, the output information of the logic interconnections according to the invention is constantly renewed by periodically repeated phase clock pulses so that the output information is retained for substantially unlimited time, the output information naturally being determined by the information appearing at the inputs of the logic circuit and by the nature of the circuit.

In the circuit according to the invention, field effect transistors with an insulated gate are preferably used for the active components. In this case, the insulating layer generally consists of the oxide of the semiconductor material. Such semiconductor components, known as MOS transistors, consist of a basic semiconductor body of the first type of conductivity into which regions of the second type of conductivity are introduced from the surface at specific distances apart. The surface area of the first type of conductivity between the said two regions is covered with an insulating layer on which the gate is mounted. Connected to each of the two regions of the second type of conductivity is an electrode which is generally termed "drain" or "source" electrode respectively. The current path controlled by the insulated gate electrode is situated between the drain electrode and the source electrode in such semiconductor devices. Such MOS transistors generally consist of monocrystalline silicon semiconductor bodies while the insulating material present between the gate and the semiconductor surface consists of silicon dioxide.

The active circuit elements in the logic interconnection according to the invention may, however, consist of bipolar depletion-layer transistors, depletion-layer field effect transistors, of electron tubes or of other non-linear circuit elements.

The logic basic unit according to the invention is particularly suitable for the construction of complex logic interconnections which process a plurality of items of information in a predetermined manner. Such circuits, which are composed of a plurality of basic circuits, which are generally alike, on a single semiconductor wafer, have recently been termed LSI (large-scale-integration) circuits. The novel LSI circuits are distinguished from known circuits by their small number of components, high speed, small space requirements and simple wiring.

Associated with the logic basic units according to the invention are capacitances which are charged or discharged by the phase clock pulses and input pulses. These capacitances are composed of the output capacitance of the basic unit, the input capacitance of the following switching stage, line capacitances and component capacitances. The logic interconnections therefore work without a separate capacitance component.

The logic interconnections according to the invention are particularly suitable for processing digital information. In this case, a logical 0 corresponds to zero potential, while in order to realize a logical 1, a negative potential is used. The input information is applied, for example, in the form of pulses, to the associated input electrodes of the logic interconnection, and the signals containing the input information appear at the electrodes, preferably at the control electrodes of the active circuit elements, during one cycle of the phase clock pulses. The phase clock pulses are therefore shorter than the input pulses containing the input information. The pulses containing the input information preferably begin in time during a phase clock pulse. Furthermore, the discharge time constant of the diode should if possible be lower than that of the transistor.

BRIEF DESCRIPTION OF THE DRAWINGS

The invention will now be further described by way of example, with reference to the accompanying drawings, in which.

In the following description, with reference to the drawings, the + sign symbolizes an OR interconnection while no sign between two information quantities (A, B or C) indicates their AND interconnection. A transverse line over the output function of a logic interconnection represents its negation by the circuit.

DESCRIPTION OF PREFERRED EMBODIMENTS

Figure 1:
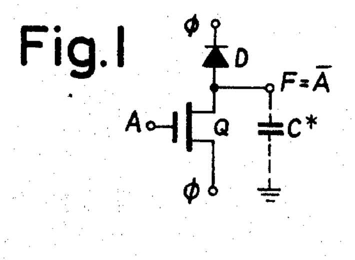
FIG. 1 shows a basic unit according to the invention operated as an inverter.
Figure 2:
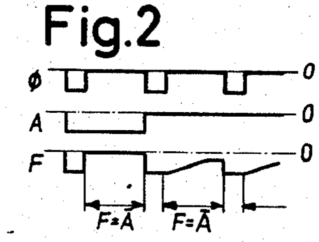
FIG. 2 illustrates the associated pulse diagram of the unit shown in FIG. 1.

FIG. 1 shows a basic unit composed of a field effect transistor Q and a diode D. The diode has a p-n junction for example or a metal-semiconductor junction. The diode is connected in series with the controlled current path of the field effect transistor. An input signal A to be negated by the circuit, which corresponds to the information to be negated, appears at the gate. The phase clock pulse $\phi$, which as shown in FIG. 2, top diagram, consists of a periodically repeated negative rectangular pulse, is applied to the other electrode of the field effect transistor which is still free and to the free electrode of the diode. The phase clock pulses may be derived from a square-wave generator. The inverted output signal F is taken off at the connection between the diode D and the transistor Q. As an aid to understanding, a charging capacitance C*, which necessarily results in such logic interconnections and therefore is not needed as a separate component, is entered in broken lines in FIG. 1 between the output electrode and earth. Let it be assumed that a logical 1 appears at the input A, that is to say a pulse with a negative potential (FIG. 2, center diagram). The capacitance C* is in any case charged through the diode, the transistor or both components, for the duration of the phase clock pulse $\phi$. The diode D is connected in series with the field effect transistor so that the diode is conducting during the negative phase clock pulse. Thus during the pulse duration of $\phi$, there is in any case a negative potential at the output F. If the phase clock pulse $\phi$ is at an end and if the negative potential of the input information still appears at the input A, the capacitance is discharged immediately across the conducting current path of the field effect transistor so that the capacitance C* is discharged after the end of the phase clock pulse and is at zero potential. Thus the negated input information appears at the output F between two phase clock pulses. Output $F = \bar{A}$. This function is also fulfilled when earth potential, and hence a logical 0, appears at the input A as information. During the pulse duration of $\phi$, the capacitance C* is again charged. When the phase clock pulse is at an end, the capacitor can no longer be discharged because both the diode and the transistor are cut off. Thus for the duration of the logical 0 at the input *A* there is always a negative potential at the output *F* and this is renewed continuously by the phase clock pulses $\phi$. The pulse diagram F at the output electrode is illustrated in FIG. 2 for the case where a logical 1 appears at the input A and then a logical 0 appears. A certain discharge of the capacitance between the phase clock pulse across the high resistances of the cut-off diode and the cut-off transistor must be accepted during the negation of the input information $A = 0$.

Figure 3:
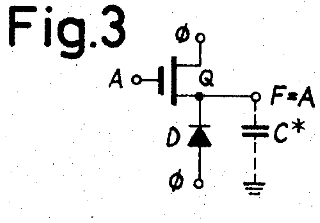
FIG. 3 shows a logic interconnection which is frequently termed a level amplifier and which likewise consists of only one basic unit and FIG. 4 shows the associated pulse diagram.
Figure 5:
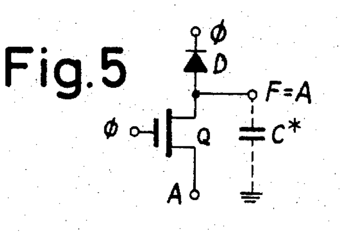
FIG. 5 shows a modification of the unit shown in FIG. 1 so that the unit can operate as a level amplifier.

FIGS. 3 and 5 show a logic interconnection wherein the output information corresponds to the input information but the level or the duration of the output signal is variable in comparison with the input signal. If field effect transistors are used, such circuits may be designated as pulse shapers for example.

Figure 4:
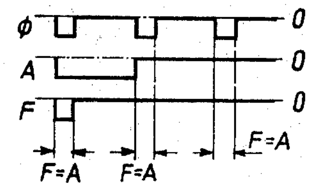

In the circuit in FIG. 3, a diode D is again connected in series with the controlled current path of a field effect transistor Q. In this case, the diode is so arranged that when a negative pulse is applied to the free electrode of the diode, it is cut off. Let it again be assumed that a logical 1, and hence a negative potential which is considerably greater than the threshold voltage of the transistor, appears at the gate of the transistor Q, at the input *A*. During the phase clock pulse $\phi$, the capacitance C* between the output electrode, which is connected to the junction between the diode and the transistor, and earth, is charged to negative potential. The height of the negative potential at C* depends essentially on the height of the negative potential of the phase clock pulse $\phi$. When the phase clock pulse $\phi$ is at an end and when earth potential appears at the free electrode of the diode, the capacitance C* is discharged across the diode D, which is now conducting, despite further negative potential appearing at the input *A*. This means that the output information corresponds to the input information only for the pulse duration of the phase clock pulse. Output $F = A$. This function is also fulfilled if, as FIG. 4 illustrates, a logical 0 and hence earth potential appears at the input *A*. In this case the transistor Q and the diode D are cut-off during the phase clock pulse $\phi$ so that the capacitance cannot be charged even during the phase clock pulses. The output signal *F* which contains the input information can thus always be taken off in the correct manner during the phase clock pulses at the junction between the diode and the active circuit element.

Figure 6:
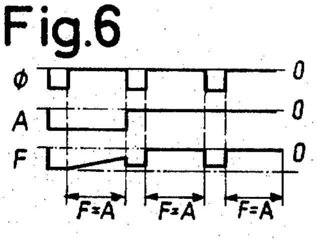
FIG. 6 illustrates a pulse diagram for the unit shown in FIG. 5.

In FIG. 5, a circuit is illustrated which is identical to the circuit illustrated in FIG. 1. In this case, however, the signal *A* containing the input information is applied to the other free electrode of the active circuit element besides the gate, while the phase clock pulse $\phi$ is applied to the gate of the active circuit element Q and to the free electrode of the diode D. Here, too, the output electrode is connected to the junction between the diode and the field effect transistor. Let it be assumed that a logical 1 and hence a negative potential, appears at the input *A* of the free electrode of the transistor. The capacitance C* between earth and the output electrode is therefore charged for the duration of the phase clock pulses, through the diode, the transistor, or both components. When the phase clock pulse is at an end, the transistor and the diode are cut off and the capacitance can no longer be discharged; it is again charged to its maximum value, however, be each phase clock pulse, as is necessary because a slight discharge of the capacitance C* is inevitable across the high-resistance current paths of the transistor and the diode between the phase clock pulses. Thus between two phase clock pulses, the function $F = A$ is fulfilled at the output. This also applies when zero potential and hence a logical 0 appears at the free electrode of the transistor. As can be seen from the diagrams in FIG. 6 for $\phi$, *A* and *F*, the capacitance C* is charged during the phase clock pulse. Since both the transistor and also the diode are conducting in this case, the voltage to which the capacitance C* is charged is determined by the divider ratio between the diode forward resistance and the transistor forward resistance. In this case, the diode forward resistance should preferably be considerably less than the transistor forward resistance. When the phase clock pulse is at an end, the capacitance is discharged across the transistor which is still conducting. This applies when the discharge time constant of the transistor is considerably greater than that of the diode. The output signal which contains the input information can thus always be taken off in the correct manner between the phase clock pulses, at the junction between the diode and the active circuit element.

Figure 7:
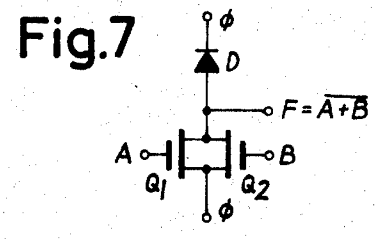
FIG. 7 shows a negated OR interconnection and FIG. 8 shows an OR interconnection.

According to FIG. 7, in order to realize a negated OR interconnection between two input items of information A and B, the controlled current paths of two active circuit elements $Q_1$ and $Q_2$ are connected in parallel. The signals A and B respectively, containing the input information, are applied to the gates of the two transistors while the periodically repeated phase clock pulse $\phi$ appears at the free end of the diode D as well as at the common free electrodes of the two active circuit elements $Q_1$ and $Q_2$ connected in parallel. The output information F is taken off at the junction between the diode D and the active circuit elements, between the individual phase clock pulses.

As can be seen from the circuit example of FIG. 1, the circuit shown in FIG. 7 fulfils the function $F=\overline{A+B}$. This means that when $A$ or $B$ is a logical 1, earth potential and hence a logical 0 is taken off at the output. In the circuit in FIG. 7, the diode is so arranged that it is conducting on the appearance of a negative phase clock pulse.

Figure 8:
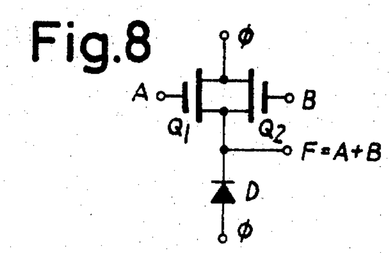

FIG. 8 shows a circuit fulfilling an OR interconnection. In order to realize it, the controlled current paths of two active circuit elements $Q_1$ and $Q_2$ are connected in parallel. The signals $A$ and $B$ containing the input information are applied to the gates of the two transistors, while the periodically repeated phase clock pulses $\phi$ are applied to the free electrode of the diode and to the common free electrode of the two active circuit elements. The diode is so connected that it is cut off when a negative phase clock pulse is applied. The signal containing the output information is taken off at the junction between the diode and the active circuits elements during a phase clock pulse. The circuit fulfills the function $F = A + B$. Its mode of operation results from the circuit as shown in FIG. 3. For example, negative potential and hence a logical 1 appears at the output $F$ during a phase clock pulse when a logical 1 and hence negative potential likewise appears at the input $A$ or $B$.

Figure 9:
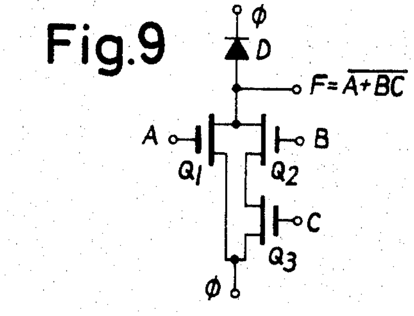
FIGS. 9 and 10 show further logic interconnections according to the invention.

FIG. 9 shows a circuit which the function $F=\overline{A+BC}$. It consists of three active circuit elements $Q_1$ $Q_2$ and $Q_3$. The controlled current paths of the transistors $Q_2$ and $Q_3$ are connected in series while the current path of the transistor $Q_1$ is connected in parallel with the series connection of the transistors $Q_2$ and $Q_3$. The signals containing the input information $A$, $B$ and $C$ are applied, with the distribution illustrated, to the gates of the transistors $Q_1$ to $Q_3$. The periodically repeated phase clock pulse $\phi$ is applied to the free electrode of the diode D and to the free electrode of the transistors connected to one another. The diode D is so connected that it is conducting when a negative phase clock pulse is applied to its free electrode. The output information $F$ is taken off at the junction between the diode and the transistors.

Figure 10:
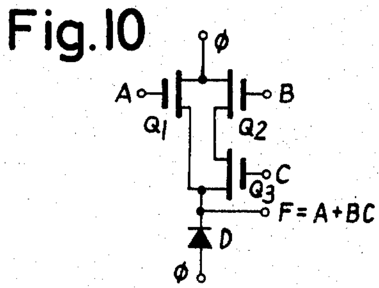

If the forward direction of the diode is reversed, as shown in FIG. 10, in a circuit such as is shown in FIG. 9, so that it is cut-off when a negative phase clock pulse is applied, the function $F = A+BC$ is obtained at the output if the input signals $B$ and $C$ are applied to the gates of the transistors $Q_2$ and $Q_3$ connected in series, and the input signal A is applied to the gate of the transistor $Q_1$ connected in parallel. It is obvious that in order to realize further logical interconnections, the current paths of a plurality of transistors may be connected in series and any desired further number of transistors, likewise connected in series with one another, may be connected in parallel with these series-connected transistors. The number of transistors is determined by the number of items of input information to be combined with one another.

Figure 11:
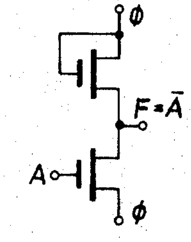
FIGS. 11 and 12 illustrate further logic interconnections according to the invention in which the diode is replaced by a field effect transistor operated as a diode.
Figure 12:
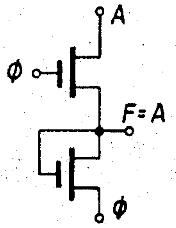

FIG. 11 illustrates a circuit wherein the diode D is replaced by a transistor, the gate of which is connected to the electrode of the same transistor at which the periodically repeated phase clock pulse appears. The circuit of FIG. 11 thus corresponds to the circuit shown in FIG. 1, while the circuit illustrated in FIG. 12 corresponds to the circuit shown in FIG. 3. The transistor replacing the diode is preferably a field effect transistor, particularly a MOS (metal-oxide semiconductor) field effect transistor. In the p-n or Schottky diodes are replaced by a field effect transistor operated as a diode, however, a reduced switching speed must be accepted in the logic interconnections.

It will be evident that apart from the logic interconnections described and illustrated in the Figures, a large number of other circuits fulfilling logical functions can be realized by means of the basic unit according to the invention.

It will be understood that the above description of the present invention is susceptible to various modifications, changes and adaptations.

What is claimed is:

1. A dynamic logic interconnection for use as an inverter which is operated by periodically repeated single phase clock pulses comprising: a semiconductor pn- or metal-semiconductor junction diode having two electrodes; a field effect transistor having an insulated gate electrode and two current path electrodes for the controlled current path thereof; means for connecting one electrode of said diode to one of said current path electrodes of said field effect transistor so that said diode is connected in series with the controlled current path of said transistor; means for applying an input signal containing information to be inverted to said gate electrode of said transistor; means for applying a periodically repeated phase clock pulse to the free electrodes of said transistor and said diode; and means for collecting an output signal which contains the inverted input information between the individual phase clock pulses, said collecting means being connected to the junction between said transistor and said diode.

2. A dynamic logic interconnection as defined in claim 1, including means for connecting said diode in series with said transistor in such a manner that said diode is conducting when a negative phase clock pulse is applied to said free electrodes.

3. A dynamic logic interconnection, for use as a logic circuit which is operated by periodically repeated single phase clock pulses comprising: a semiconductor pn- or metal-semiconductor junction diode having two electrodes; a field effect transistor having an insulated gate electrode and two current path electrodes for the controlled current path thereof; means for connecting one electrode of said diode to one of said current path electrodes of said field effect transistor so that said diode is connected in series with the controlled current path of said transistor; means for applying a signal containing input information to said gate electrode of said transistor; means for applying a periodically repeated phase clock pulse to the free electrodes of said transistor and said diode; and means for collecting an output signal which contains the input information during a phase clock pulse, said collecting means being connected to the junction between said transistor and said diode.

4. A dynamic logic interconnection as defined in claim 3, in which said field effect transistor is a MOS field effect transistor.

5. A dynamic logic interconnection as defined in claim 3, in which said field effect transistor is a depletion-layer field effect transistor.

6. A dynamic logic interconnection as recited in claim 3, including means for connecting said diode in series with said transistor in such a manner that said diode is cut-off when a negative phase clock pulse is applied to said free electrodes.

7. A dynamic logic interconnection which is operated by periodically repeated single phase clock pulses comprising: a semiconductor pn- or metal-semiconductor junction diode having two electrodes; a field effect transistor having an insulated gate electrode and two current path electrodes for the controlled current path thereof; means for connecting one electrode of said diode to one of said current path electrodes of said field effect transistor so that said diode is connected in series with the controlled current path of said transistor; means for applying a signal containing input information to the other current path electrode of said transistor; means for applying a periodically repeated phase clock pulse to said gate electrode of said transistor and the other electrode of said diode, said means for connecting one electrode of said diode to one of said current path electrodes connecting said diode in series with said transistor in such a manner that said diode is conducting when a negative phase clock pulse is applied to said gate and diode electrodes; and means for collecting an output signal which contains the input information between the individual phase clock pulses, said collecting means being connected to the junction between said transistor and said diode.

8. A dynamic logic interconnection for use as an OR interconnection which is operated by periodically repeated single phase clock pulses comprising: a semiconductor pn- or metal-semiconductor junction diode having two electrodes; a field effect transistor having an insulated gate electrode and two current path electrodes for the controlled current path thereof; means for connecting one electrode of said diode to one of said current path electrodes of said field effect transistor so that said diode is connected in series with the controlled current path of said transistor; a further field effect transistor having an insulated gate electrode, said further field effect transistor having its controlled current path connected in parallel with the controlled current path of said first mentioned field effect transistor; means for applying respective signals containing input information to the respective gate electrodes of said field effect transistors; means for applying a periodically repeated phase clock pulse to the free electrode of said diode and the free electrodes of said field effect transistors; and means for collecting a signal which contains output information between the individual phase clock pulses, said collecting means being connected to the junction between said diode and said field effect transistors.

9. A dynamic logic interconnection as defined in claim 8, including means for connecting said diode in series with said field effect transistors in such a manner that said diode is conducting when a negative phase clock pulse is applied to said free electrodes whereby said logic interconnection is a negated OR interconnection.

10. A dynamic logic interconnection as defined in claim 8, including means for connecting said diode in series with said field effect transistors in such a manner that said diode is cut-off when a negative phase clock pulse is applied to said free electrodes.

11. A dynamic logic interconnection which is operated by periodically repeated single phase clock pulses comprising: a semiconductor pn- or metal-semiconductor junction diode having two electrodes; a field effect transistor having an insulated gate electrode and two current path electrodes for the controlled current path thereof; means for connecting one electrode of said diode to one of said current path electrodes of said field effect transistor so that said diode is connected in series with the controlled current path of said transistor; two additional field effect transistors with insulated gate electrodes, said additional field effect transistors having their controlled current paths connected in series, said first mentioned field effect transistor having its controlled current path connected in parallel with the controlled current paths of said two additional field effect transistors; means for applying respective signals containing input information to the respective gate electrodes of said field effect transistors; means for collecting a signal containing output information from the junction between said diode and said first mentioned field effect transistor; and means for applying a periodically repeated phase clock pulse to the other electrode of said diode and the other current path electrode of said first mentioned field effect transistor.

12. A dynamic logic interconnection which is operated by periodically repeated single phase clock pulses comprising: a semiconductor pn- or metal-semiconductor junction diode having two electrodes; a field effect transistor having an insulated gate electrode and two current path electrodes for the controlled current path thereof; means for connecting one electrode of said diode to one of said current path electrodes of said field effect transistor so that said diode is connected in series with the controlled current path of said transistor; means for applying signals containing input information to the gate electrode of said field effect transistor; and means for applying a periodically repeated phase clock pulse to the other electrode of said diode and the other current path electrode of said field effect transistor, said signals containing input information being applied at least for the duration of a phase clock pulse.

13. A dynamic logic interconnection which is operated by periodically repeated single phase clock pulses comprising: a semiconductor pn- or metal-semiconductor junction diode having two electrodes; a field effect transistor having an insulated gate electrode and two current path electrodes for the controlled current path thereof; means for connecting one electrode of said diode to one of said current path electrodes of said field effect transistor so that said diode is connected in series with the controlled current path of said transistor; means for applying signals containing input information to the gate electrode of said field effect transistor; and means for applying a periodically repeated phase clock pulse to the free electrode of said diode and the free electrode of said field effect transistor, said signals containing input information starting, in time, during a phase clock pulse.

14. A dynamic logic interconnection as defined in claim 13, in which the discharge time constant of said diode is less than that of said field effect transistor.

* * * * *

UNITED STATES PATENT OFFICE

CERTIFICATE OF CORRECTION

Patent No. 3,683,201 Dated August 8th, 1972

Inventor(s) Tegze Haraszti

It is certified that error appears in the above-identified patent and that said Letters Patent are hereby corrected as shown below:

In the heading of the patent, after line 3, insert:
--[73] Assignee: Licentia Patent-Verwaltungs-G.m.b.H., Frankfurt am Main, Germany--.

Signed and sealed this 22nd day of May 1973.

(SEAL)
Attest:

EDWARD M.FLETCHER,JR.
Attesting Officer

ROBERT GOTTSCHALK
Commissioner of Patents

Notice of Adverse Decision in Interference

In Interference No. 98,411 involving Patent No. 3,683,201, T. Haraszti, LOGIC INTERCONNECTIONS, final judgment adverse to the patentee was rendered Apr. 10, 1974, as to claims 1, 2, 8, 9, 11, 12, 13 and 14.

[*Official Gazette August 13, 1974.*]